Aug. 20, 1963
A. ASHKIN
3,101,449
PARAMETRIC ELECTRON BEAM DEVICES
Filed May 20, 1958
3 Sheets-Sheet 1
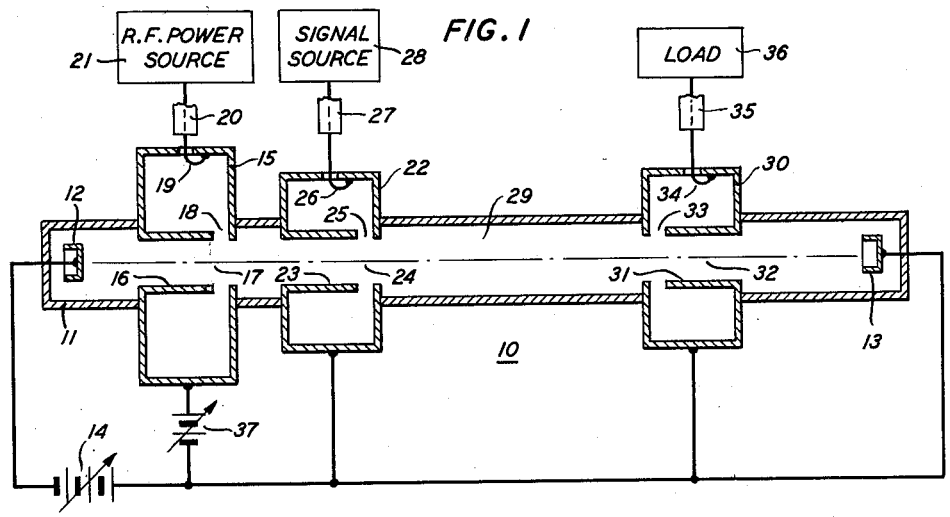
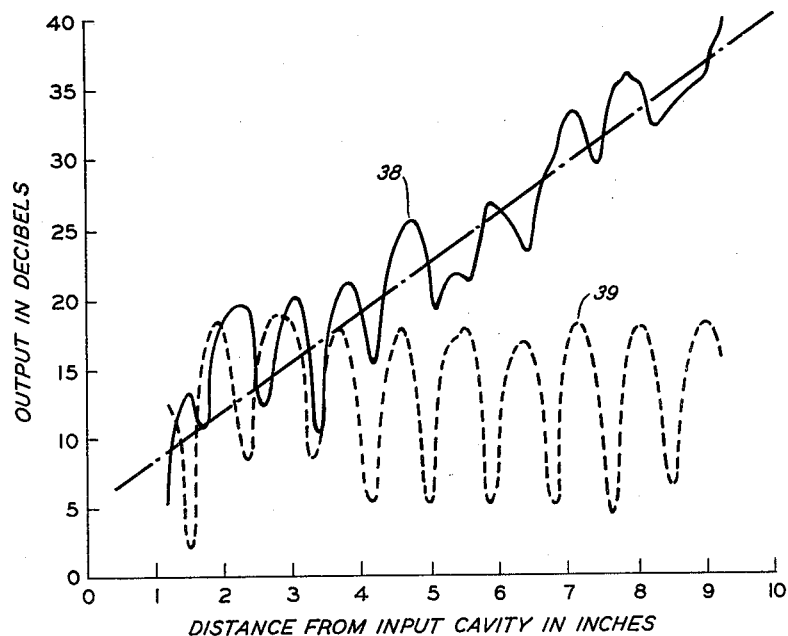
INVENTOR
A. ASHKIN
BY
ATTORNEY

INVENTOR
A. ASHKIN
BY
ATTORNEY

Aug. 20, 1963  A. ASHKIN  3,101,449
PARAMETRIC ELECTRON BEAM DEVICES
Filed May 20, 1958  3 Sheets-Sheet 3

INVENTOR
A. ASHKIN
BY
ATTORNEY

United States Patent Office 3,101,449
Patented Aug. 20, 1963

3,101,449
PARAMETRIC ELECTRON BEAM DEVICES
Arthur Ashkin, Bernardsville, N.J., assignor to Bell Telephone Laboratories, Incorporated, New York, N.Y., a corporation of New York
Filed May 20, 1958, Ser. No. 736,639
10 Claims. (Cl. 330—4.7)

This invention relates to high frequency electron discharge devices and, more particularly, to those of the velocity modulation type which utilize the interaction between an electron beam and electromagnetic wave energy to produce amplification and/or oscillations.

In general, velocity modulation utilizing the interaction between the beam and the electric field in a high frequency circuit produces alternating-current components of electron velocity in the beam, which, upon passing through a drift region becomes bunched or density modulated. The bunched beam then interacts with another portion of the same circuit or with a different circuit to produce amplification of the wave energy. One such device is the traveling wave tube, wherein the beam is projected along a slow wave circuit a plurality of wavelengths long, and interaction takes place between the beam and a wave on the slow wave circuit over a substantial portion of this length to produce amplification. Another type of velocity modulation device is the klystron, wherein the beam is projected past one or more cavity resonators and interaction takes place between the beam and the radio-frequency electric field within the resonators.

Such devices as the foregoing are capable of producing high gain, but are inherently noisy in operation. Efforts to achieve comparable gain and reduced noise have led to a number of different types of devices.

In a copending application of T. J. Bridges and R. Kompfner, Serial No. 666,812, filed June 20, 1957, now Patent 2,972,081, granted February 14, 1961, there is disclosed a different type of velocity modulation device wherein parametric amplification is utilized. The parametric amplification is accomplished by utilizing an electron beam modulated with radio-frequency energy at twice the signal frequency, so as to vary the reactance of a floating drift tube type of cavity resonator. In varying the reactance of this resonator, there is presented to the remainder of the system a frequency-dependent negative resistance, the largest negative value of which occurs at the signal frequency. If the value of the negative resistance is adequate, and the load is made one of the positive resistances, the small total resistance of the system results in large signal amplification being realized with a low noise content.

In a copending application of C. F. Quate, Serial No. 698,854, filed November 25, 1957, now Patent 2,974,252, granted March 7, 1961, an extremely low noise parametric amplifier is disclosed wherein a radio-frequency power source is utilized to modulate the beam in only the fast mode. Since, as known in the art, the kinetic power of the beam in the presence of fast space charge waves is greater than the direct-current power, to excite the fast space charge waves radio-frequency power must be delivered to the beam. Advantageously, under such a condition, the fast mode noise content on the beam may be effectively removed by simply abstracting the excess radio-frequency power representative of the noise in the fast mode of the beam. The beam is then modulated with a signal to be amplified in the fast mode, which has a frequency preferably, but not necessarily, one half that of the radio-frequency energy source. Exponential gain is then realized to the extent of the excess of kinetic power in the beam over and above the direct-current power, in other words, to the extent of the radio-frequency power input, which can be extracted for utilization.

Disadvantageously, however, while parametric devices as just described exhibit improvement in gain as well as a reduction in the noise content of the beam over the aforementioned conventional velocity modulation devices, an upper frequency limit has been imposed upon these devices as well as conventional devices for two principal reasons. First, in the case of the conventional traveling wave tube and klystron, the frequency limit has been imposed primarily by the minute physical dimensions of the wave propagating or resonant high frequency circuitry necessary at ultra-high frequencies, such as in the millimeter wave range. The necessity of reducing the physical size of the wave propagation or resonant circuit correspondingly impairs the effective area and/or electric field intensity with which a beam and the high frequency circuit can be in field coupling relation. Second, in the case of velocity modulation devices previously described which utilize the phenomenon of parametric amplification, the upper frequency limit in these devices has been limited heretofore primarily by the requirement that the radio-frequency energy source, or pump, as it is often termed, be at a frequency higher than, and preferably twice, the signal frequency for effective operation. This follows from the fact that in accordance with the principles of operation relied upon in such devices, parametric amplification decreases as the frequency of the radio-frequency energy source, which supplies the power for signal amplification, approaches the frequency of the signal to be amplified.

In a copending application of H. Suhl and P. K. Tien, Serial No. 724,103, filed March 26, 1958, and now abandoned, there is disclosed an amplifying arrangement which, to a large extent, overcomes the upper frequency limit imposed upon the aforementioned types of devices. As therein disclosed, the device comprises a wave propagating structure which is partially or fully imbedded in a nonlinear reactance medium such as a ferromagnetic medium. The propagating structure consists of, in effect, two or more transmission lines which are closely intercoupled through the nonlinear medium either at a plurality of discrete points or continuously throughout their length. In that application it is shown that if certain frequency relationships are observed between the signal and the pumping frequency it is possible to achieve parametric amplification with a pumping frequency which is less than the signal frequency. In such a case when the signal wave is propagated along one of the transmission lines and the reactance medium has introduced therein the pumping frequency there will be generated a plurality of idler frequencies which propagate along the transmission lines and are amplified along with the signal frequency. Under such conditions, where the pumping frequency may be less than the signal frequency, the upper frequency limitations are, to a large extent, eliminated. However, the gain realized with such devices is not commensurate with the frequencies which may be attained. For one reason, this follows from the fact, as shown in this copending application, that only idler frequencies below the pump frequency can abstract power from the pump source and mix in a manner, described in detail hereinafter, which will produce amplification of the signal wave. Thus, as the pump frequency is reduced below one half the signal frequency, additional idler frequencies are established, some of which have a frequency higher than the pump frequency and others which have a frequency lower than the pump frequency. Since only the idlers having a frequency below the pump frequency abstract power directly from the pump source, the remaining idlers which participate in the amplification process actually abstract power from the pump source via the lower frequency idlers at the expense of the signal wave. Further, the necessity for maintaining a uniformity of reactive coupling between the transmission lines creates difficult manufacturing problems. In addition, it is desirable that the idler frequencies which do not participate in the amplification process in such devices be suppressed, necessitating additional circuitry in the form of filters or the like. Moreover, such a device does not lend itself readily to the generation of oscillatory wave energy or permit tuning such oscillations over a wide frequency band inasmuch as it is basically a structure having fixed circuit parameters.

Accordingly, it is an object of this invention to achieve the generation and amplification of frequencies much higher than heretofore attainable in velocity modulation type devices.

It is another object of this invention substantially to eliminate the high frequency limitations heretofore imposed upon the structures of velocity modulation type devices whereby ultra-high frequency amplification and oscillations may be obtained.

It is still another object of this invention to achieve ultra-high frequency broad-bandwidth amplification and wide band electronic tuning of oscillatory wave energy in velocity modulation type devices.

It is still an additional object of this invention to achieve ultra-high frequency amplification and oscillation in a device of uniquely simple and practical construction.

My invention is based upon the discovery that parametric amplification or generation of oscillatory energy can be realized in an electron beam device by modulating the beam with radio-frequency pump energy at a frequency less than the frequency of the signal to be amplified. Heretofore, in such electron beam devices parametric amplification has been achieved through the utilization of a radio-frequency source of pumping power which is characterized by having a frequency preferably twice the signal frequency. I have discovered that the electron beam can be modulated with a signal wave and with pumping power of a frequency less than the signal wave and there will be generated upon the beam and propagated therealong, in addition to the signal wave and the pumping wave, idler frequencies, and that high gain amplification at exceedingly high frequencies is realized without the use of coupled transmission lines and the like.

Accordingly, it is a feature of this invention to modulate an electron beam with signal wave energy to be amplified and with radio-frequency pump energy at a frequency less than the signal frequency, and to generate at least two idler waves of frequency less than the pump frequency which effectively abstract power from the pump wave and contribute to the exponential amplification of the signal wave.

It is another feature of this invention to generate idler waves above the pump frequency which contribute to the signal power output, these idler waves being generated through the expedient of pump harmonics.

It is a further feature of my invention that an electron beam be velocity modulated by both a signal frequency and a pump frequency wave at a lower frequency than the signal frequency, the velocity modulated space charge waves on the beam generating idler waves, at least two of which idler waves are of lower frequency than the signal frequency, converting the velocity modulating space charge waves to density modulated waves, abstracting power from the pump frequency wave to increase the power of the idler waves, parametrically increasing the power of the signal frequency wave by interaction with the idler waves, and abstracting the signal frequency wave from the election beam after this increase of power.

Further, in accordance with these features of my invention the velocity modulation of the electron beam at the signal and pump frequencies may be attained by projection of the beam through a variety of structural arrangements, including resonant cavities and slow wave interaction circuits. Additionally, the generation of the idler frequency waves, the conversion of the velocity modulated waves to density modulated waves, the abstraction of power from the pump frequency wave to the idler frequency waves, and the exponential growth of the signal wave due to interaction with the idler frequency waves may be attained in a variety of structural arrangements including the projection of the electron beam and the associated space charge waves along a drift region or through an interaction circuit.

In accordance with these and other features of my invention in one specific illustrative embodiment thereof there is a first cavity resonator, resonant at a frequency less than the frequency of the signal energy to be amplified, positioned adjacent the beam path for modulating the beam with a pumping frequency. A second cavity resonator, spaced apart from the first cavity resonator by a short drift region, is utilized to modulate the beam with the signal to be amplified. After emergence from the second cavity resonator, the beam has impressed thereon, in addition to the radio-frequency pump modulations, modulations at the higher signal frequency.

In accordance with the principles of this invention, these two sources of modulation established space charge waves which in turn mix parametrically and generate at least two basic idler waves which have a frequency below the pump frequency. In passing along a drift region these idler waves abstract power from the pump wave or a harmonic thereof and, as will be explained more fully hereinafter, provide the means by which the signal modulations grow exponentially during passage through the drift region. The electron beam then passes through a third cavity resonator to which an output coupling means is connected for abstracting the exponentially amplified signal energy.

In a modification of the above-described embodiment, the second and third cavity resonators are connected by an external feedback circuit with an output coupling connection attached thereto. Such a structure forms an effective ultra-high frequency oscillator which embodies the features of this invention.

In another illustrative arrangement which embodies the features of my invention, there is a first cavity resonator resonant at a frequency less than the signal to be amplified, positioned adjacent the beam path for modulating the beam with pumping energy. A wave propagation circuit positioned further downstream along the path of flow is utilized in place of the second and third cavity resonators. Advantageously, this circuit is designed to operate effectively as a backward wave interaction circuit wherein the beam functions as an internal feedback path. The beam in passing through the first interaction circuit, namely, the cavity resonator, is modulated with radio-frequency pump energy at a frequency less than the oscillatory signal energy to be amplified. In passing through the backward wave interaction circuit, noise components in the beam excite a background traveling oscillatory signal wave on the circuit which in turn space charge modulates the beam at the desired frequency to be amplified. The pump and signal space charge waves then generate the necessary idler wave for signal amplification in accordance with the principles of this invention.

In still another illustrative arrangement embodying the features of my invention, an internal wave propagation circuit of the backward wave type is employed in place of the cavity resonator to impress radio-frequency pump energy at a frequency less than the signal energy upon the beam. Significantly, with an internal backward wave circuit utilized for generating and modulating the beam with radio-frequency pump energy, the oscillatory frequency of this pump source may advantageously be tuned electronically by the simple expedient of varying the beam voltage. In this way, the frequency of the pumping source can be made to track the frequency of the signal in a manner whereby the exponential gain may be optimized over a considerably wide range of frequencies.

In an additional illustrative arrangement which embodies the features of this invention, two floating drift tube double gap cavity resonators are employed in conjunction with two wave propagation couplers positioned downstream thereof. The first cavity resonator is designed, as described in detail hereinafter, to abstract the noise content of the beam in only the fast space charge wave mode. The beam is then modulated in passing through the second cavity resonator with radio-frequency pump energy at a frequency less than the signal frequency in only the fast mode. Thereafter, in passing through the first wave propagation coupler the beam is modulated with signal energy to be amplified which is applied thereto and the amplified version of the signal abstracted by a second wave propagation coupler downstream thereof.

A complete understanding of this invention and of these and other features thereof may be gained from consideration of the following detailed description taken in conjunction with the accompanying drawing in which:

FIG. 1 is a schematic view of one illustrative arrangement which embodies the principles of this invention;

FIG. 2 is a diagram illustrating exponential amplification in accordance with the principles of this invention with a device such as illustrated in FIG. 1;

Figure 3:
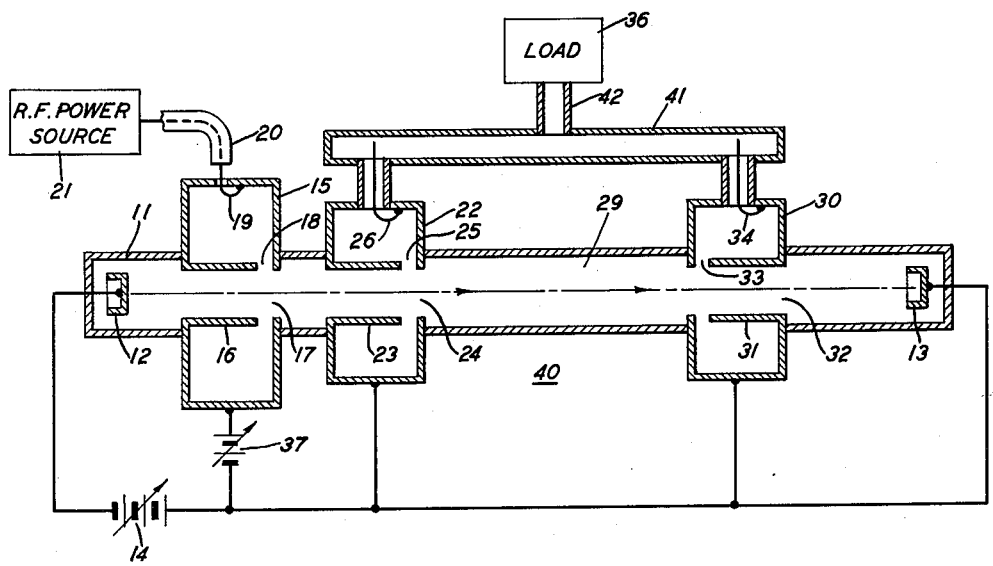
FIG. 3 is a schematic view of an illustrative arrangement for the generation of oscillations in accordance with the principles of this invention.

Referring now to FIG. 1, there is depicted schematically an ultra-high frequency amplifier 10 which embodies the principles of my invention. Positioned within and at opposite ends of an evacuated envelope 11, which, for example, may be of glass or any other suitable material, is an electron gun 12 for projecting an electron beam along an extended path to a collector 13. The electron gun is shown schematically and will, in practice, generally comprise an electron emissive cathode surface, a heater assembly, intensity control electrode, and beam forming and accelerating electrodes. For the sake of simplicity, these elements have been omitted from this and other figures to follow. The collector 13 serves as the collector of electrons and is, accordingly, maintained at a suitable potential which is positive with respect to the electron emissive cathode of the electron gun 12 by means of suitable lead-in connections from an adjustable voltage source 14. Located intermediate the ends of the elongated envelope 11 is a first cavity resonator 15 which preferably is of highly conductive material. The resonator 15, as shown in FIG. 1, as well as the other figures to follow, may be incorporated into the elongated envelope 11 as a part thereof or may be mounted either internally or externally of the envelope in a manner well known in the art. Resonator 15 is provided with a hollow reentrant portion 16 axially aligned with the electron beam. Opposite the interior ends of the reentrant portion 16 is an aperture 17 in the wall of the cavity resonator which is axially aligned with the reentrant portion and with the electron beam so that the beam may pass completely through the cavity resonator. The resonator wall with aperture 17 and the interior end of reentrant portion 16 are in close proximity to each other, thereby defining a gap 18 across which the electron beam passes. It is to be understood that while cavity resonator 15 has been shown here as comprising a reentrant portion for defining a narrow gap, other suitable geometric configurations might be used, and the arrangement here shown for resonator 15, as well as for the remaining resonators to be discussed hereinafter, is intended merely to be by way of illustration. An input coupling means 19 is connected through a suitable transmission line 20 to a source of radio-frequency power 21, the purpose of which will be explained more fully hereinafter.

Downstream of the first cavity resonator 15, that is to say at a point along the axis of the beam more remote from the electron gun than resonator 15, is a second cavity resonator 22, which, like cavity resonator 15, may form a part of the evacuated envelope 11 or it may be mounted internally or externally thereof. Cavity resonator 22, which structurally is quite similar to cavity resonator 15, is provided with a hollow reentrant portion 23 and an aperture 24 in the wall of resonator 22, the distance between the interior end of reentrant portion 23 and the resonator wall with aperture 24 defining a gap 25. Resonator 22 is provided with an input signal means 26 connected through a suitable transmission line 27 to a signal source 28, the significance of which also is described in greater detail below.

Downstream of resonator 22 and separated by a drift region 29 is located a third cavity resonator 30, which, as was the case with resonators 15 and 22, may form a part of envelope 11 or may be mounted internally or externally thereof. While the drift region 29 in this as well as the other illustrative embodiments is depicted as being formed by the wall of envelope 11, if the envelope is of insulative material, such as glass, a separate conductive drift tube sleeve within the envelope 11 would preferably be utilized to prevent charging of the wall defining the drift region by stray impinging electrons during operation. Resonator 30 similarly comprises a hollow reentrant portion 31 and an aperture 32 in the wall of resonator 30, with the distance between the interior end of the reentrant portion 31 and the resonator wall with aperture 32 defining a gap 33. An output coupling loop 34 communicates with the interior of cavity resonator 30 and abstracts the amplified signal energy through a suitable transmission line 35 to a load 36. Inasmuch as cavity resonator 15 is resonant at a frequency less than resonators 22 and 30 in accordance with the principles of this invention, a separate variable voltage source 37 is shown connected thereto. This advantageously permits the transit time or angle of the electrons traversing the gap 18 of resonator 15 to be optimized independently of resonators 22 and 30.

In general, such a device is provided with a magnetic focusing structure or other suitable means, not here shown, for focusing the electron beam throughout its travel along the path of flow from the electron gun 12 to the target 13, and which may comprise any one of a number of such arrangements well known in the art.

In operation, an electron beam is formed and projected from the electron gun 12, to the target 13, passing axially through each of the cavity resonators. The electron beam in traversing gap 18 in cavity resonator 15, interacts with radio-frequency pump energy supplied from the pump source 21, which energy, in accordance with the principles of this invention, is at a frequency less than the frequency of the signal wave to be amplified. The significance of the pump energy frequency will become more apparent hereinafter. The interaction between the electron beam and the pump wave energy in cavity resonator 15 effectively produces velocity modulations of the electrons in the beam. After emergence from the cavity resonator 15, the beam passes through the gap 25 in cavity resonator 22 wherein the beam is similarly velocity modulated with the signal energy to be amplified at a frequency higher than the pump frequency. In traversing the drift region 29, the radio-frequency pump and signal velocity modulations are converted into density modulations in the form of space charge waves.

More significantly, however, in accordance with the principles of this invention, is the fact that the pump and the higher frequency signal space charge waves parametrically mix to produce at least two basic idler waves, both of which have a frequency less than the pump frequency. These idler waves in turn actually abstract power from the pump wave at the fundamental frequency and contribute either directly or cumulatively with additional idler waves generated through parametric mixing with one or more pump harmonics to amplify the signal wave which, together with the idler waves, grow exponentially in amplitude with distance along the drift region 29. In passing through the cavity resonator 30 the amplified signal space charge wave on the beam induces a voltage across gap 33 whereby the electrons lose their energy under the action of this voltage and deliver amplified signal energy through the transmisison line 35 to the load 36.

In order to understand better the principles of this invention and the unique type of parametric amplification phenomenon which occurs in the operation just described, the following analysis will be helpful.

Prior experimentation and theoretical analysis have shown that in velocity modulation devices, for example, one can achieve parametric amplification of a signal space charge wave at a frequency $\omega_s$ on the electron beam at the expense of a higher frequency radio-frequency space charge wave at a frequency $\omega_p$, the latter being generated by an energy source referred to hereinafter as the pump. Under this condition the beam generates, in the form of space charge waves, a so-called idler wave at a frequency $\omega_i$. This idler wave, as in the case of the signal space charge wave, grows exponentially with distance along the path of flow. The frequency of this idler is found from the relation:

$$\omega_{pump} = \omega_{signal} + \omega_{idler} \qquad (1)$$

Inasmuch as the source of power is the higher frequency pump, it can be shown by theoretical analysis, that the upper frequency limit of parametric signal amplification is, therefore, dependent upon the pump frequency $\omega_p$.

As mentioned previously, in an abandoned application of H. Suhl and P. K. Tien, Serial No. 724,103, filed March 26, 1958, there is disclosed a type of parametric amplifier which may operate with four basic frequencies, the significance of such operation being that the pump frequency $\omega_p$ may be less than the signal frequency $\omega_s$. The amplifier disclosed therein does not utilize an electron beam, but rather, employs separate signal and idler transmission lines which are intercoupled through a distributed reactance medium along their respective lengths. This reactive medium is then varied in a predetermined manner by a pump source in accordance with ferromagnetic resonance phenomena to produce parametric amplification.

In accordance with the principles of this invention, I have discovered that the four frequency concept of parametric amplification is even more compatible, under certain conditions, to be described hereinafter, to velocity modulation devices operating either as oscillators or as amplifiers. Moreover, such a device operating as an oscillator, in accordance with the four frequency case, permits a much wider tunable frequency range of oscillations than is possible with a distributed reactance, fixed dimensioned, wave propagation circuit. This arises from the fact that the electron beam effectively affords simultaneously the propagating paths or lines for both the signal wave to be amplified and the two or more idler waves necessary in the amplification process. Further, the constants of the beam may advantageously be varied, in a manner analogous to varying the aforementioned distributed reactance medium, by the expedient of space charge modulating the electron beam with radio-frequency energy from either an external or internal pump source, in accordance with this invention, at a frequency less than the signal frequency.

In order to visualize better the theoretical relationship between the four basic frequencies involved, the case will be considered where the relationship between the four basic frequencies holds true for both the aforementioned variable reactance devices and the velocity modulation devices of the instant invention, and then, the significance of and advantages realized with the devices embodying the principles of this invention will be discussed.

By way of example, the pump frequency $\omega_p$ will be assumed to satisfy the expresison $$\omega_p = \frac{\omega_s}{2} + \Delta \qquad (2)$$

where $\omega_p$ is the pump frequency, $\omega_s$ is the signal frequency and $\Delta$ is an incremental frequency defined between the limits:

$$0 < \Delta < \frac{\omega_s}{2} \qquad (3)$$

In this case, the signal frequency $$\omega_s \text{ and } \frac{\omega_s}{2} + \Delta$$

will mix to give an idler frequency:

$$\omega_{idler_1} = \omega_s - \left(\frac{\omega_s}{2} + \Delta\right) = \frac{\omega_s}{2} - \Delta \qquad (4)$$

From Equation 4 it is apparent that $$idler_1, \frac{\omega_s}{2} - \Delta$$

is less than the pump frequency $\omega_p$, as defined in Equation 2 and thus, as can be shown by theoretical analysis and which has been verified experimentally, this idler can abstract power from the pump by a second idler defined as:

$$\omega_{idler_2} = \omega_p - \left(\frac{\omega_s}{2} - \Delta\right) = 2\Delta \qquad (5)$$

which also grows exponentially with distance along the path of flow.

Similarly, it can be seen that the pump frequency defined as $$\frac{\omega_s}{2} + \Delta$$

in Equation 2 and the idler frequency defined as $$\frac{\omega_s}{2} - \Delta$$

in Equation 4 can mix to give parametric signal amplification at:

$$\left(\frac{\omega_s}{2} + \Delta\right) + \left(\frac{\omega_s}{2} - \Delta\right) = \omega_s \qquad (6)$$

which is the original signal frequency. Advantageously, as a result of the frequency relationship between the pump and signal frequencies, the beam automatically generates the necessary idlers $$\frac{\omega_s}{2} - \Delta \text{ and } 2\Delta$$

which also serve to mix back and give gain at the signal frequency $\omega_s$. Significantly, since the beam generates the necessary idlers, it is also possible to utilize a pump frequency less than $$\frac{\omega_s}{2}$$

Depending upon the particular values, the beam must simply generate the necessary number of idlers until one pair is less than the pump frequency. More particularly, if the pump frequency $\omega_p$ is within the range $$\frac{\omega_s}{n} > \omega_p > \frac{\omega_s}{n+1} \qquad (7)$$

then the total number of frequencies involved is $n+3$ where $n > 0$.

It is thus seen that in a velocity modulation device in accordance with the principles of this invention, the electron beam advantageously affords the transmission path for both the signal and idler waves simultaneously, with the radio-frequency energy impressed thereon in the form of space charge modulations effectively varying the constants of the beam to produce parametric amplification. This is in contradistinction to the device disclosed in the aforementioned H. Suhl-P. K. Tien copending application wherein separate transmission paths are required for the signal and certain of the idler waves, with coupling between these paths necessitating a distributed reactance medium of fixed physical dimensions which is varied by the radio-frequency energy source. While the pump frequency may possibly be below $$\frac{\omega_s}{2}$$

for amplification in the aforementioned structures, the value of gain realized is considerably reduced as the pumping frequency is reduced below $$\frac{\omega_s}{2}$$

This follows from the basic principle of the conservation of energy, in that the growth of the signal and idler waves, the latter progressively increasing in number as the pump frequency is reduced below $$\frac{\omega_s}{2}$$

must be at the expense of the energy of some external source, which in the case of the above-described type of parametric amplification, comes about by interaction with and abstraction of energy from the pumping source. Accordingly, with a wide frequency separation between the signal and pump frequency in such devices, frequency conversion utilizing the various idlers is effective, but not without a significant reduction in gain.

Advantageously, in accordance with principles of my invention, effective parametric mixing and substantial amplification of the signal wave are also realized with a pump frequency less than $$\frac{\omega_s}{2}$$

(the so-called four frequency case analyzed above). This is possible primarily because of the fact that the non-linear characteristics of the beam are very conducive to generating harmonic space charge wave components. Accordingly, with a strong pumping source, harmonics of the pump frequency are advantageously impressed upon the beam. I have discovered that the frequencies generated by virtue of the higher harmonic pump frequencies are of just the same character as the two basic idlers established in the four frequency analysis described above. Thus, since the signal frequency below a given pump harmonic and all idler frequencies below either a particular pump harmonic or fundamental thereof can abstract power from the pumping source, there is an added source of parametric gain which serves to reinforce the parametric gain realized at just the pump frequency $\omega_p$ alone.

By way of example, consider the above case where $$\omega_p = \frac{\omega_s}{2} + \Delta$$

and $$0 < \Delta < \frac{\omega_s}{2} \qquad (8)$$

Under these conditions, the second harmonic of the pump frequency $\omega_p$, is equal to $\omega_s + 2\Delta$ which is higher than the signal frequency. Thus, the signal frequency $\omega_s$ will mix with the pump harmonic $\omega_s + 2\Delta$ to give an idler frequency at $2\Delta$ which will abstract power and grow exponentially. The idler $2\Delta$ being less than the pump frequency $$\omega_p = \frac{\omega_s}{2} + \Delta$$

also abstracts power from the pump frequency $\omega_p$ via an idler defined as follows $$\omega_p - 2\Delta = \frac{\omega_s}{2} + \Delta - 2\Delta = \frac{\omega_s}{2} - \Delta \qquad (9)$$

Thus, it is seen that the same idler frequencies $$\frac{\omega_s}{2} - \Delta \text{ and } 2\Delta$$

are generated automatically through the expedient of an electron beam whether $\omega_p$ or a harmonic thereof is utilized in the case where $\omega_p$ is greater than $$\frac{\omega_s}{2}$$

It can be similarly shown that when the pump frequency $\omega_p$ is less than $$\frac{\omega_s}{2}$$

the same idlers are established whether mixing takes place between the signal frequency $\omega_s$ and the fundamental pump frequency $\omega_p$ or with a harmonic thereof. Accordingly, by utilizing a nonlinear electron beam with a high energy pump source having a frequency less than the signal frequency in accordance with this invention, there results a number of higher frequency pump harmonics being impressed upon the beam in the form of space charge waves which will serve to reinforce the amplification of the signal waves over and above that realized with just the pump source at the pump frequency. Accordingly, the prior disadvantages realized in parametric amplifiers utilizing a variable reactance medium, namely, a progressively decreasing reduction in signal gain as the pump frequency is reduced below $$\frac{\omega_s}{2}$$

is substantially eliminated over a considerably wide frequency separation between the signal and pump frequencies.

By way of example, FIG. 2 illustrates the amplification achieved with a device such as depicted in FIG. 1. With a pumping cavity resonant at 2973 megacycles and with 50 milliwatts of pumping power applied thereto, and a fixed signal at a frequency of 4200 megacycles applied to a signal cavity resonator, curve 38 depicts the exponential signal gain in decibels versus distance in inches along the drift region as detected with an adjustable output cavity resonant at 4200 megacycles. It is significant to note that with no pumping power, the signal wave depicted by curve 39 remains at substantially constant amplitude in the form of a standing wave and is representative of the maximum signal gain attainable by conventional klystron amplification. Accordingly, the exponentially increasing signal wave depicted by curve 38 clearly points up the significance and advantages realized with this invention, especially at ultra-high frequencies.

FIG. 3 illustrates schematically an ultra-high frequency oscillator 40 embodying the principles of my invention. Inasmuch as the circuit elements in FIG. 3 are basically identical to those depicted in the device of FIG. 1, the same reference numerals will be used to designate corresponding elements which will not be specifically described hereinafter other than by way of aiding in the description of the operation of the device. The basic structural difference in the oscillator 40 of FIG. 3 is in the utilization of an external feedback circuit, shown by way of example as a rectangular waveguide 41. Waveguide 41 is connected to cavity resonators 22 and 30 by coupling loops 26 and 34, respectively. An output waveguide coupling section 42 transfers a portion of the amplified oscillatory energy to load 36.

In operation, an electron beam is formed and projected from the electron gun 12, to the collector 13, passing axially through each of the cavity reasonators. The electron beam in traversing gap 18 in cavity resonator 15 interacts with radio-frequency pump energy supplied from the pump source 21, which energy, in accordance with the principles of this invention, is at a frequency less than the frequency of the oscillatory signal energy to be amplified. Such interaction effectively produces velocity modulations of electrons in the beam. After emergence from the cavity resonator 15, the beam passes through the gap 25 in cavity resonator 22 wherein it is similarly velocity modulated with oscillatory signal energy to be amplified at a frequency higher than the pump frequency. The oscillatory signal energy is applied to resonator 22 through the external feedback path comprising the rectangular waveguide 41. This signal energy is initially established by low amplitude noise components on the beam, which in traversing the drift region 29 become density modulations of sufficient magnitude to excite an oscillatory wave at the desired frequency when the electron beam traverses gap 33 in resonator 30.

In traversing the drift region 29, the pump and oscillatory signal density modulations, in the form of space charge waves, parametrically mix, as seen from the above-described analysis, and generate at least two basic idler waves having a frequency less than the pump frequency which abstract power from the pump wave at the fundamental frequency. These idler waves directly or in combination with additional idler waves generated through parametric mixing with harmonics of the pump wave provide the primary source of power by which the oscillatory signal wave grows exponentially with distance along the drift region 29. In passing through the cavity resonator 30, the amplified oscillatory signal energy on the beam is abstracted by output coupling loop 34 and fed into the feedback waveguide 41, the major portion of the amplified signal energy going to the load 36 through output coupling section 42, the remainder being fed back to cavity resonator 22 so as to sustain oscillations.

Whereas an external feedback path is utilized in the device depicted in FIG. 3, it may often be advantageous to employ an internal feedback mechanism, utilizing the electron beam itself as the medium by which energy from a higher energy state is transferred to a lower energy state. In other words, the beam maybe used to act as a positive feedback path.

Figure 4:
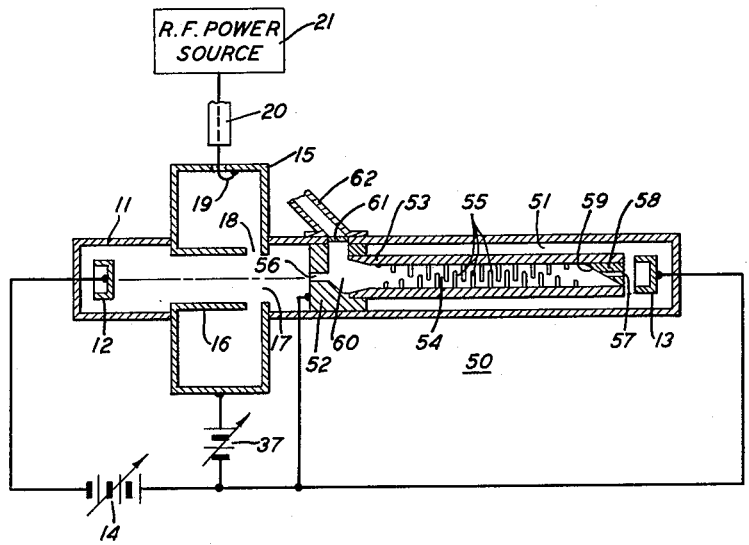
FIG. 4 is a schematic view of another illustrative arrangement for the generation of oscillations in accordance with the principles of this invention.

FIG. 4 discloses an electron discharge device 50 which, by way of example, utilizes a so-called spatial harmonic backward wave circuit 51 designed specifically for ultra-high frequency wideband applications and adapted for operation in accordance with the principles of this invention. It is to be understood that various other types of ultra-high frequency circuits designed for spatial harmonic interaction may be utilized in accordance with the principles of this invention with equal effectiveness. The features and characteristics of the particular circuit illustrated in FIG. 4 are specifically disclosed in a copending application of R. Kompfner, Serial No. 327,566, filed December 23, 1952, now Patent 2,895,071, granted July 14, 1959. Circuit elements in FIG. 4 which are similar to those appearing in FIGS. 1 and 3 are identified by corresponding reference numerals. The harmonic circuit 51 comprises an output section 52 at the upstream end with respect to the electron gun 12 and an elongated waveguide interaction circuit 53, preferably of nonmagnetic material such as copper, extending along the path of flow and in axial alignment therewith. The interaction circuit 53 has a hollow interior, preferably of rectangular cross section, which serves as a waveguiding passage 54 therethrough. The hollow waveguide passages 54 contains a linear array of U-shaped wire-like elements 55. This linear array includes two uniformly spaced rows of elements 55 extending inwardly from one of two opposite sidewall surfaces of the waveguide interaction circuit 53. The two rows of elements are interleaved to form an interdigital pattern with the lengths adjusted so that there is an overlapping region formed through which the beam may pass. The cross-sectional dimensions of the passage 54 are increased at the upstream end adjacent the output section 52 for the purpose of obtaining an effective impedance matching transformation. The interaction circuit 51 is provided with suitable apertures 56 and 57 at opposite ends for traversal of the election flow axially therethrough. For backward wave oscillator applications, the collector or downstream end of the passage 54 is closed off except for the aperture 57. In order to prevent wave reflections at the downstream end with respect to the collector 13, there is inserted in the passage 54 a tapered block or wedge 58 of dielectric material with its tapered face 59 coated with lossy material such as powdered graphite. At the electron source end or upstream end, the waveguiding passage 54 merges into a waveguiding passage 60 formed as the interior of output section 52 of structure 51. This waveguiding passage 60 similarly is of rectangular cross section for matching the cross section of the waveguiding passage 54 at the point of merger. To ensure an effective abstraction of energy, a conventional right angle bend is provided between the waveguiding passages 54 and 60. At the wall of the glass envelope 11, waveguiding passage 60 may be capacitively couple through a dielectric window 61, for example, to an external waveguiding connection 62 whereby the exponentially amplified oscillatory energy can be led off for utilization. The remaining circuit elements are identical to those described in FIG. 1, and comprise the cavity resonator 15 positioned between the gun 12 and interaction circuit 51 with a reentrant portion 16, an aperture 17 and a gap 18 defined therebetween. A radio-frequency power source 21 is applied to resonator 15 through a suitable transmission line 20 and coupling loop 19. Voltages are applied to the various circuit elemnts other than resonator 15 by a variable source 14, a separate variable source 37 being utilized for resonator 15 so as to permit adjustment of the transit time of electrons passing across the gap 18 during operation.

It is characteristic of a circuit such as 51 that a wave traveling with a group velocity therealong in a given direction will give rise to components which have a phase velocity in the opposite direction. The electron beam is adjusted to have a velocity substantially equal to the phase velocity of one of such components, whereby cumulative interaction between the beam and the wave component is made possible and amplification of the wave is achieved. Since the direction of wave energy propagation and electron flow are opposite, the electron beam provides positive feedback coupling, acting to return energy from points of higher level at the upstream end to points of lower level at the downstream end along the path of flow for sustaining oscillations.

The type of backward wave operation described above is further enhanced, in accordance with the principles of this invention, by a type of parametric amplification which permits a significant improvement in efficiency to be realized at ultra-high frequencies. More specifically, in the absence of the radio-frequency pump source 21 utilized to modulate the beam at a frequency below the operating frequency, a signal tends to build up on the circuit and beam due to ordinary backward wave interaction. If operation is desired in the millimeter wave range, the interaction is very weak and only a weak signal is present due to the minute physical dimensions required at such frequencies as well as the limitations imposed upon the beam current. Advantageously, by modulating the beam with radio frequency pump energy, the oscillatory wave energy at a higher frequency is not only amplified, in accordance with principles of this invention, but the beam current normally required to sustain oscillation is lessened.

With the execption of generating the oscillatory wave energy by means of electronic feedback, the operation of the device 50 of FIG. 4 is quite similar to that of the device 40 in FIG. 3. The electron beam is projected through cavity resonator 15 wherein the beam, upon traversing gap 18, is velocity modulated by radio-frequency energy supplied from the power source 21. Upon entering the interaction circuit 51, the electron beam is adjusted to be in synchronism with a spatial harmonic component of the noise induced wave of a desired frequency which has a phase velocity in the direction opposite to that of wave propagation. As was shown above in regard to the analysis directed to the particular type of parametric amplification utilized in the embodiments of FIGS. 1 and 3, as well as those which follow, in traversing the distance of the interaction circuit 51, at least two basic idler waves are generated which abstract power from the pump wave or harmonics thereof and either directly or via additional idler waves provide the source of power by which the oscillatory space charge signal wave is exponentially amplified. Thus, as oscillatory backward wave at the desired frequency approaches the output section 52, it constitutes a signal wave of considerably greater magnitude than would have been possible with only a conventional backward wave circuit. Moreover, in accordance with the principles of this invention, the radio-frequency or pump frequency, by being considerably below the desired oscillatory signal frequency, permits the circuitry associated with the pump source as well as the resonator itself to be of more suitable dimensions at ultra-high frequencies which both facilitates the fabrication of these elements and makes for easier coupling of wave energy therethrough to the beam.

Similarly, a backward wave oscillator of the type disclosed in FIG. 4 not only provides output efficiencies of a magnitude heretofore unattainable at extremely high frequencies, but permits continuous tuning of the oscillator electronically over a wide band of frequencies by the simple expedient of varying the beam voltage.

Figure 5:
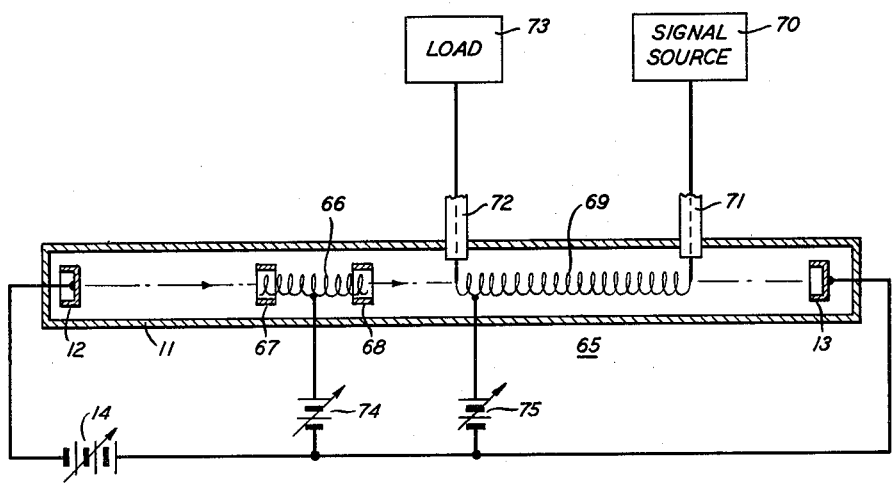
FIG. 5 is a schematic view of a backward wave amplifier embodying the principles of this invention.

FIG. 5 discloses a backward wave amplifier 65 embodying the principles of this invention and quite similar in many respects to the backward wave oscillator disclosed in FIG. 4. In describing the various tube elements, the same reference numerals will be used to designate certain of the elements corresponding to those in FIGS. 1, 3 and 4. The device 65 comprises an evacuated envelope 11 at opposite ends of which are an electron gun 12 for projecting an electron beam and a target 13 for collecting the beam. Intermediate the gun 12 and target 13 is a first interaction circuit 66 of known backward wave design shown herein, for purposes of illustration only, as a helix. Helix 66 is terminated at both ends by resistive terminations 67 and 68, which may take any of the known forms, such as lossy rings surrounding the ends of the helix as shown. Such terminations enhance the generation of oscillatory wave energy, which constitutes the pump energy in accordance with this embodiment. A helix 69 of known backward wave design is positioned intermediate helix 66 and target 13 for propagating electromagnetic signal energy in coupling relation with the electron beam. A conventional helix has similarly been shown here only by way of example, and by reason of simplicity. It is to be understood that other known interaction circuits, such as interdigital, ladder, serpentine or a spatial harmonic circuit of the type disclosed in FIG. 4 may be utilized in place of either helix 66 or 69 with equal effectiveness.

A signal at a frequency higher than the pump frequency, in accordance with principles of this invention, is applied from a signal source 70 through a suitable transmission line 71 to the downstream end of helix 69 for propagation upstream therealong and for interaction with the beam in accordance with known backward wave phenomena. The upstream end of helix 69 is connected through a suitable coupling connection 72 to a load 73. Voltages are applied to helices 66 and 69 by variable voltage sources 74 and 75, respectively, which permit these helices to be tuned electronically so as to optimize the gain for a given signal frequency. Voltages are applied to the remaining circuit elements by the variable voltage source 14.

While the internal pump source 66 has been shown in conjunction with a backward wave amplifier herein, it is to be understood that such a pump source may be similarly utilized in any of the other embodiments of this invention with equal effectiveness.

In operation, the electron beam is adjusted to interact with a particular backward or oppositely directed traveling oscillatory wave on the helix 66. Such a wave of low amplitude is set up initially by noise components of the beam. As is known, amplification of this noise induced wave requires that the beam be adjusted to be substantially in synchronism with the phase velocity of a forward traveling spatial harmonic of this particular backward traveling wave. From such interaction, the beam is velocity modulated in much the same manner as with the cavity resonator and radio frequency energy applied thereto disclosed in FIGS. 1, 3 and 4. Upon entering the interaction circuit 69, the electron beam is similarly adjusted to be in synchronism with a spatial harmonic component of the signal wave to be amplified which has a phase velocity in the direction opposite to that of wave propagation. In accordance with the principles of parametric amplification described herein, at least two basic idler waves having a frequency less than the pump frequency are generated in the mixing process and these idler waves abstract power from the pump wave and directly or in combination with additional idlers generated by mixing with harmonics of the pump wave grow in amplitude and provide the source of power by which the signal space charge wave is exponentially amplified. Since the signal space charge wave is in synchronism with a spatial harmonic component of the fundamental signal wave, it effectively supplies the energy by which the fundamental signal wave is amplified. The exponentially amplified signal wave is then abstracted at the upstream end of helix 69 through the coupling connection 72 for utilization in a load 73.

Figure 6:
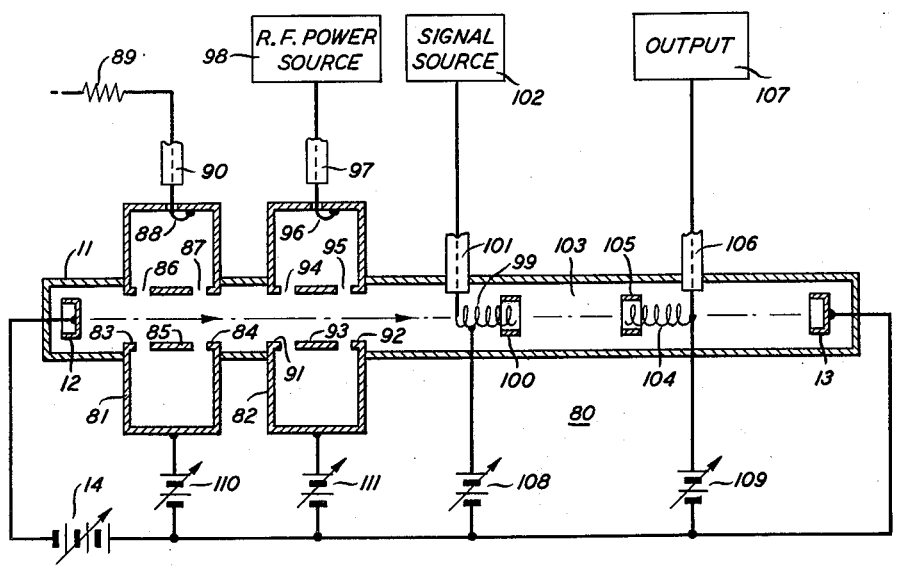
FIG. 6 is a schematic view of another amplifier embodying the principles of this invention.

FIG. 6 discloses a forward wave amplifier 80 embodying the principles of this invention and which utilizes two floating drift tube double gap cavity resonators 81 and 82. The significance of the double gap cavity resonators and the specific manner in which the beam is space charge modulated are features disclosed in the aforementioned copending application of C. F. Quate, Serial No. 698,854, Patent 2,974,252 which features will be briefly described hereinafter. Using the same reference numerals to designate certain of the elements corresponding to those in FIGS. 1, 3, 4 and 5, the backward wave amplifier comprises an evacuated envelope 11 at opposite ends of which are an electron gun 12 for projecting an electron beam along an extended path and a target 13 for collecting the electron beam. Located intermediate the ends of the elongated envelope 11 is a first cavity resonator 81 which is preferably of highly conductive material. As explained in regard to FIG. 1, the resonators utilized in FIG. 6 may be incorporated into the elongated envelope 11 as a part thereof or they may be mounted externally or internally of envelope 11. Cavity resonator 81 is provided with a first hollow reentrant portion 83, and a second hollow reentrant portion 84. Between the interior ends of the two reentrant portions is located a hollow conductive member 85 defining a drift region having a distance of preferably a quarter plazma wavelength within the resonator, the specific function and significance of which is fully discussed in the aforementioned copending application of C. F. Quate. The interior end of reentrant portion 83 and one end of member 85 are in close proximity to each other, thereby defining a narrow gap 86 past which the electron beam is projected. The interior end of reentrant portion 84 and the end of member 85 adjacent thereto are likewise in close proximity and define a narrow gap 87, past which the electron beam is projected. An output coupling loop 88 for abstracting energy from the resonator 81 communicates with the interior of the resonator and is connected to a dissipative load 89 through a suitable transmission line 90.

Downstream of cavity resonator 81, that is to say at a point along the axis of the beam more remote from the electron gun than cavity resonator 81, is a second resonator 82 which structurally is quite similar to resonator 81. Resonator 82 thus comprises first and second hollow reentrant portions 91 and 92 and a hollow conductive member 93 which, with reentrant portions 91 and 92, define a pair of gaps 94 and 95. Resonator 82 is provided with an input coupling loop 96 which is connected through a suitable transmission line 97 to a source of radio-frequency pump power 98.

Downstream of resonator 82 is located a signal input coupler circuit 99, which by way of example and for simplicity, is shown in the form of a short section of conductive helix for propagating and transferring electromagnetic wave signal energy to the beam in the form of space charge wave energy. Helix coupler 99 is terminated at the downstream end by a resistive termination 100, which may comprise, by way of example, a lossy ring surrounding the helix as shown. Helix coupler 99 has applied thereto through a suitable input coupling connection 101 signal energy to be amplified from a signal source 102. At the downstream end of the device 80, separated from the helix input coupler 99 by a drift space 103, is an output helix coupler 104, the upstream end of which is terminated by a resistive termination 105. A suitable output coupling connection 106 is supplied to abstract energy from the output helix coupler 104 and apply it to a utilization circuit designated by the load 107.

In operation, the electron beam is projected through cavity resonator 81 where the noise energy in the signal frequency range and in the fast mode only is abstracted from the beam. As was previously mentioned in regard to the aforementioned copending application of C. F. Quate, the electron beam is characterized by having noise modulations both in the fast and slow mode after it leaves the electron gun 12. Cavity resonator 81 is made resonant at the midband frequency of the signals to be amplified, and as the beam passes through the double gap cavity resonator 81 it gives up noise energy in the signal frequency range and in the fast wave mode to cavity resonator 81. This noise energy is then abstracted through the output coupling loop 88 and is absorbed by dissipative member 89. The beam upon emerging from resonator 81 is then substantially completely free of noise modulations in the fast mode within the frequency range of the signals to be amplified, although there still remains on the beam noise modulations in the slow wave mode and in the fast wave mode outside of the desired signal frequency range.

As the beam passes through cavity resonator 82, which, in accordance with the principles of this invention, is made resonant at a radio frequency pump frequency less than the signal frequency, it is modulated in the fast mode with radio frequency energy from source 98 so that when the beam emerges from cavity resonator 82, it has impressed thereon radio frequency energy in the form of velocity modulations over and above the energy of the beam prior to its entry into resonator 82. The beam then passes in interacting relationship with a signal wave propagating along the helix input coupler 99. This coupler excites upon the beam signal energy in the form of fast mode space charge waves at the desired signal frequency. In passing through the drift region 103, in accordance with the principles of this invention, the fast mode signal waves on the beam increase exponentially via idler waves generated at the expense of pumping power supplied from the radio frequency pump source 98. The exponentially amplified fast mode signal wave energy then excites and produces on helix output coupler 104, electromagnetic wave signal energy for utilization which is substantially greater in magnitude than could possibly be obtained by conventional velocity modulation operation at ultra-high frequency.

In order to insure complete signal energy transfer from the helix input coupler to the electron beam and vice versa with respect to the output helix coupler, it is desired that these helix couplers be designed to satisfy the "Kompfner Dip" condition, the significance of which is discussed in detail in the copending aforementioned Quate application. Mentioned briefly, an input helix coupler operating in the "Kompfner Dip" condition assures that there will be no wave energy propagating on the helix at the downstream end thereof, all of the energy having been transferred to the beam. The converse of this concept is utilized with respect to the output helix coupler wherein all of the fast mode energy on the beam appears as electromagnetic wave signal energy at the downstream end of the output helix coupler. Further, in order that amplification in the fast wave mode may be achieved it is necessary that the wave energy propagating along the helix couplers 99 and 104 be synchronized with only the fast wave mode on the electron beam. As is known, the fast mode space charge wave propagates along an electron beam at a velocity greater than the direct current velocity of the beam in contradistinction to the slow mode space charge wave which propagates along the beam at a velocity less than the direct current velocity of the beam. Therefore, it is necessary that the beam as it travels along helix coupler 99 in interacting relationship therewith, travel at a velocity slower than the velocity of the wave propagating along the helix to the extent that the fast mode on the beam is in synchronism with the signal wave propagating along helix coupler 99. To this end, helix coupler 99 is maintained at a suitable potential by means of a variable source 108. Similarly, a separate variable voltage source 109 is connected to output helix coupler 104 so as to obtain optimum signal energy transfer from the beam to the coupler in a manner independent of the other circuit elements. In order to adjust the transit angle of electrons passing through cavity resonators 81 and 82 separately, two variable voltage sources 110 and 111 are respectively connected thereto. A third variable voltage source 14 is shown for applying the proper potential to the remaining circuit elements.

It is to be understood that the specific embodiments described are merely illustrative of the general principles of the present invention. For example, other types of beam coupling or interaction circuits which afford interaction between wave energy and an electron beam could be utilized in place of the cavity resonators depicted in FIGS. 1, 2 and 4. Similarly, the particular sequence in which the radio-frequency energy and signal energy is impressed upon the beam is not critical, and it is to be understood that such functions could be transposed with equal effectiveness.

What is claimed is:

1. A high frequency electron discharge device comprising an evacuated envelope, means including an electron gun for forming and projecting an electron beam along an extended path within said envelope, means positioned along said path for modulating said beam with high level radio-frequency energy at a predetermined fundamental frequency and at harmonic frequencies thereof, means disposed along said path for introducing signal energy to be amplified in coupling relation with said beam, said signal energy having a frequency higher than said predetermined frequency, and means disposed along said path for abstracting the amplified signal energy from said beam.

2. A high frequency electron discharge device comprising an evacuated envelope, means including an electron gun for forming and projecting an electron beam along an extended path within said envelope, first circuit means positioned along said path for modulating said beam with high level radio-frequency energy at a predetermined fundamental frequency and at harmonic frequencies thereof, second circuit means positioned along said path for modulating said beam with signal energy to be amplified, said signal having a frequency which is higher than said predetermined frequency, and output means coupled to said second circuit means through which the amplified signal energy is abstracted.

3. A high frequency electron discharge device in accordance with claim 2 wherein said first circuit means comprises a wave propagation circuit of the backward wave type and said second circuit means comprises a wave propagation circuit, means for terminating the ends of said first wave propagation circuit to be substantially reflectionless, input coupling means at one end of said second wave propagation circuit for applying the signal to be amplified, said output means being at the other end of said circuit for abstracting the amplified signal energy therefrom.

4. A high frequency electron discharge device in accordance with claim 2 wherein said first circuit means comprises a resonant cavity and said second circuit means comprises a wave propagation circuit.

5. A high frequency electron discharge device in accordance with claim 4 wherein said wave propagation circuit is of the backward wave spatial harmonic type, and further including means for terminating the downstream end of said circuit to be substantially reflectionless with said output means being coupled to the upstream end of said circuit for abstracting oscillatory energy therefrom.

6. A high frequency oscillator comprising an evacuated envelope, means including an electron gun for forming and projecting an electron beam along an extended path within said envelope, first circuit means positioned along said path for modulating said beam with high level radiofrequency energy at a first predetermined fundamental frequency and at harmonic frequencies thereof, second circuit means positioned along said path for modulating said beam with oscillatory signal energy to be amplified at a predetermined frequency which is higher than said first predetermined frequency, third circuit means positioned along said path for abstracting the oscillatory signal energy from said beam, wave propagating feedback means connecting said second and third circuit means, and output means coupled to said wave propagating feedback means for abstracting the amplified oscillatory signal energy.

7. A high frequency oscillator in accordance with claim 6 wherein said first, second and third circuit means comprise cavity resonators with said second and third cavity resonators being separated by a drift region and said wave propagating feedback means and said output means comprise hollow waveguide members.

8. A high frequency electron discharge device comprising an electron source for projecting an electron beam along a predetermined path, a source of input signal energy, means coupled to said signal source and disposed along said path for modulating said beam to produce signal energy waves, a source of radio frequency pump energy at a frequency less than the frequency of said signal input energy, means coupled to said source of pump energy and disposed along said path for modulating said beam to produce pump energy waves, the magnitude of said radio frequency pump energy being sufficiently high to give rise to the generation of at least two idler waves on said beam, a substantially field free region of sand beam through which power is effectively abstracted both from said pump wave and said idled waves and delivered to said signal wave whereby said signal wave is exponentially amplified, and means disposed along said path for abstracting the amplified signal energy from said beam.

9. A high frequency electron discharge device comprising an evacuated envelope; means including an electron gun for forming and projecting an electron beam along an extended path within said envelope; means disposed along said path for modulating said beam with signal energy to be amplified to produce waves in said beam at signal frequency; means for effecting the exponential amplification of said signal frequency waves comprising means positioned along said beam path for modulating said beam with radio-frequency pump energy of sufficient level to give rise to the generation of waves at pump frequency in said beam whereby an idler wave of a lower frequency than said pump frequency is produced in said beam, and a substantially field free region of said beam wherein power from pump frequency waves and harmonics thereof interact to increase the power of said idler wave and wherein the power of the signal frequency energy is parametrically increased by the interaction of said idler wave with said signal energy modulations of said beam; and means disposed along said path for abstracting the amplified signal energy from said beam.

10. An amplifying system comprising, an evacuated envelope, means including an electron gun for forming and projecting an electron beam along an extended path within said envelope, a source of high frequency energy at signal frequency, means coupled to said source of signal frequency energy and disposed along said path for modulating said beam in response to said signal frequency energy, a source of high frequency pump energy of a lower frequency than said signal frequency, means coupled to said source of pump energy and disposed along said path for modulating said beam at said pump frequency and at harmonic frequencies thereof in response to said pump signal energy, the magnitude of said pump frequency energy from said pump energy source being selected to generate at least two idler waves on said beam of lower frequency than said pump frequency, whereby said idler waves and said signal waves interact with said pump energy modulations of said beam such that power is effectively abstracted from said pump wave and contributed to the exponential amplification of said signal energy, and means disposed along said path for abstracting amplified signal energy from said beam.

References Cited in the file of this patent

UNITED STATES PATENTS

| 2,480,133 | Hansen | Aug. 30, 1949 |
| 2,579,480 | Feenberg | Dec. 25, 1951 |
| 2,584,308 | Tiley | Feb. 5, 1952 |
| 2,657,305 | Knol et al. | Oct. 27, 1953 |
| 2,794,936 | Huber | June 4, 1957 |

OTHER REFERENCES

Article by W. H. Louisell and C. F. Quate, "Parametric Amplification of Space Charge Waves," Proc. I.R.E. for April, 1958, pages 707 to 716.